A. S. HUBBARD.
SYSTEM OF ELECTRICAL DISTRIBUTION.
APPLICATION FILED JULY 22, 1903.
974,063.
Patented Oct. 25, 1910.
2 SHEETS—SHEET 1.
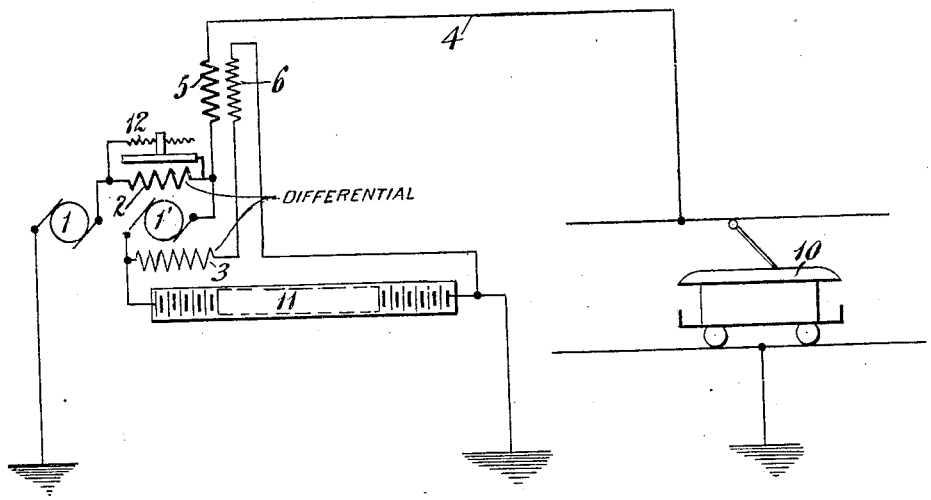
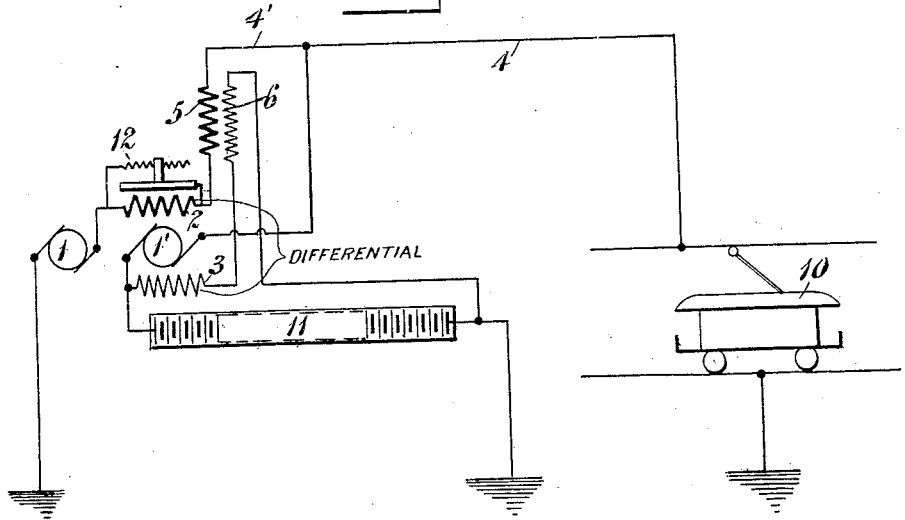
Witnesses
J. J. Liner
H. C. Workman.
Inventor
Albert S. Hubbard
By his Attorneys A. S. HUBBARD.
SYSTEM OF ELECTRICAL DISTRIBUTION.
APPLICATION FILED JULY 22, 1903.
974,063.
Patented Oct. 25, 1910.
2 SHEETS—SHEET 2.
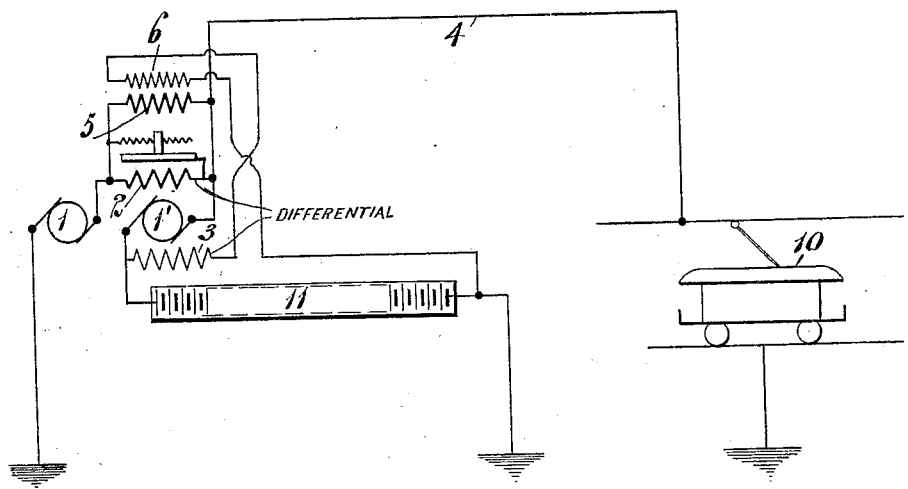
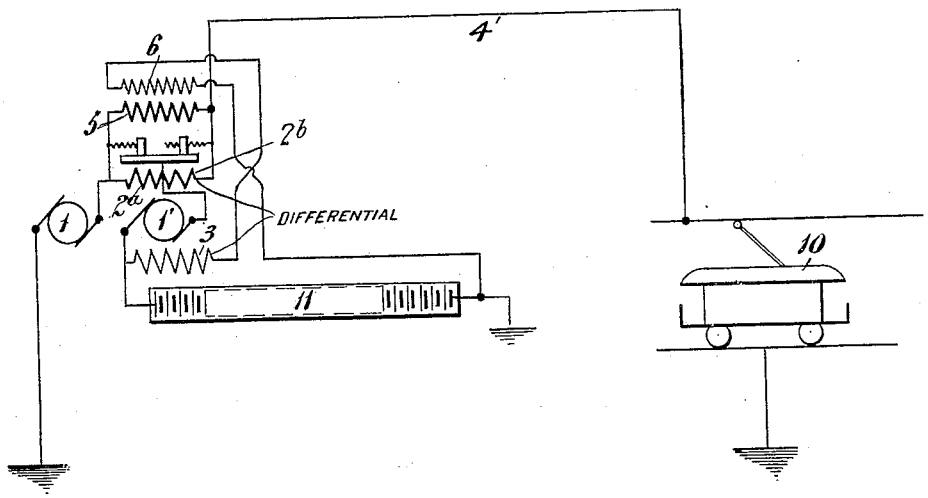
Witnesses
J. J. Liner
H. C. Workman
Inventor
Albert S. Hubbard
By his Attorneys

UNITED STATES PATENT OFFICE.

ALBERT S. HUBBARD, OF GREENWICH, CONNECTICUT, ASSIGNOR TO GOULD STORAGE BATTERY COMPANY, A CORPORATION OF NEW YORK.

SYSTEM OF ELECTRICAL DISTRIBUTION.

974,063.

Specification of Letters Patent. Patented Oct. 25, 1910.

Original application filed February 20, 1902, Serial No. 94,914. Divided and this application filed July 22, 1903. Serial No. 166,582.

*To all whom it may concern:*

Be it known that I, ALBERT S. HUBBARD, a citizen of the United States, residing at Greenwich, in the county of Fairfield, State of Connecticut, have invented certain new and useful Improvements in Systems of Electrical Distribution, of which the following is a specification.

This application is a division of a former application for Letters Patent, filed by me February 20, 1902, Serial No. 94,914, patented Feb. 14, 1905, No. 782,340, and the invention herein relates more especially to systems of distribution having a regulating dynamo.

One object of this invention is to provide means for overcoming the lack of sensitiveness of the regulating dynamo to certain fluctuations in the load and prevent such fluctuations from falling upon the generator in an undue amount.

In one embodiment of my invention I provide an induction device responsive to electrical changes in the distribution circuit and which influences the regulating dynamo or booster in order to cause the latter to respond more quickly to sudden changes in the load. The invention, therefore, is more especially applicable to systems of a character which are liable to experience sudden changes in the load, for instance, distribution systems for operating elevators, street railways, and other motor or power circuits.

Further objects, features and advantages will more clearly appear from the detailed description given below taken in connection with the accompanying drawings which form a part of this specification.

Figure 1 of the drawings illustrates diagrammatically one form of my invention with the induction device arranged in the work circuit proper. Fig. 2 is a similar view illustrating the induction device in the generator circuit. Fig. 3 is a similar view illustrating a further modification. Fig. 4 is a similar view illustrating a still further modification.

In the several views of the drawings similar letters of reference indicate corresponding features.

Referring to Fig. 1, 1 represents the main source of electromotive force or generator supplying the distribution circuit 4 for a load such as is represented by the numeral 10, which is subject to considerable fluctuation.

1' represents the booster and 11 represents a storage battery, the booster 1' being arranged in the battery connection. The booster 1' is provided with field coils 2 and 3, coil 2 being in series in the generator circuit and coil 3 is a shunt coil connected to any convenient source of approximately constant electro-motive force, such as for instance, across the battery terminals. Any suitable regulating means for these coils may be employed such as a rheostatic resistance, as indicated at 12.

The induction device is indicated by the numerals 5 and 6 and is of the nature of a transformer having the primary 5 connected so as to be responsive to fluctuations in the load on the work circuit, and having the secondary 6 connected so as to influence the booster field.

The voltage relation between the generator 1' and the battery 11 may be any relation desired, for instance, the battery may have a voltage equal to the generator voltage, under which condition, with an average load, the battery will be neutral, neither charging nor discharging. Thus, with this arrangement and adjustment, an increase of load will cause a booster E. M. F. assisting the battery to discharge and a decrease of load will cause a booster E. M. F. in the opposite direction assisting the battery to charge, so that substantially all the various fluctuations in load upon the system are taken by the battery and the load upon the generator is maintained substantially constant. Or the battery voltage may be less than the generator voltage, under which condition the booster is regulated to supply an E. M. F. equal to the difference, so that under average conditions similar results occur as in the first instance, an increase of load causing an increase of booster E. M. F. assisting the battery to discharge, and a decrease in load cutting down the booster E. M. F. to permit the battery to charge. Also the battery may have a greater voltage than the generator, under which conditions the booster will be adjusted to give, with the average load, an E. M. F. opposing that of the battery equal to the difference. With this arrangement an increase in load will result in reducing the booster E. M. F. permitting the battery to discharge and the decrease in load will result in an increased booster voltage causing the battery to charge. The adjustment and winding of the booster field coils and of the induction apparatus to bring about the desired results to meet the conditions of the system will be readily apparent to those skilled in the art.

In order to more specifically describe the position of the induction device and the arrangement of the booster field coils I have employed the term "distribution circuit" to indicate the entire circuit from the generator terminals through the load. The consumption or work circuit is meant to signify the circuit from the junction of the booster and battery to the generator lead and through the load. The generator circuit is from the generator to the junction of the battery and booster lead with the line. Therefore a coil in the generator circuit and a coil in the work circuit are both in the distribution circuit.

In Fig. 1 the primary 5 of the induction device is arranged in the work circuit proper. In this position the induction device is responsive to the fluctuations in the entire load. With this arrangement the system acts as follows: A sudden increase of load causes an increase of current in the primary 5. This induces an electromotive force in the secondary 6 in a direction to oppose the electromotive force normally impressed upon the booster field 3 and the booster field coil 2 therefore predominates. This results in a booster electromotive force causing the battery to discharge to take the increased load. However, as soon as the change in load ceases the electromotive force in the coil 6 ceases and therefore the regulating action of the induction device ceases. However, by this time the increase of load through the field coil 2 is felt by the booster 1′ and this increase in strength of the field coil 2 will maintain the booster action at its proper value until some further change in the electrical condition of the system occurs. Thus the sluggishness of the booster is overcome. Upon reversed conditions, that is, with a drop in the load the electromotive force induced in the secondary 6 will be in the opposite direction thereby causing field coil 3 to predominate to cause the battery to charge.

In Fig. 2 the primary of the induction device is shown connected in the generator circuit proper, that is, in the circuit between the generator and the booster connection. In this position the induction device is responsive to all fluctuations which fall upon the generator.

In Fig. 3 the primary of the induction device is shown connected in shunt to the booster field coil 2. With this arrangement the generator load current passes through the primary 5 of the booster coil 2 in accordance with the relative impedance of the two paths.

In Fig. 4 the booster field coil 2 is shown divided into two sections $2^a$ and $2^b$, the booster lead being connected to the central portion of the coil, as shown. The two portions of the coil are wound and so connected that their effect is cumulative and their relative effects may be adjusted by means of rheostats as desired. In this modification the induction device is responsive in part to variations in the total generator current and in part to variations in the work circuit current. In each of the figures, however, the general operation of the systems is the same as that described with reference to Fig. 1. The induction device 5, 6 acts to cause the effects of self induction and mutual induction in the booster 1′ to be cut down or eliminated, so that the booster action is much more quickly responsive to load changes. From the above it will also be apparent that the quicker the fluctuation of load the quicker and the greater will be the action of the induction device since its action depends upon the rate of change of current in the primary 5. As soon as the current in the primary 5 becomes substantially constant the transformer ceases to act but the booster field coil 2 provides the necessary excitation in order to cause the booster to provide the proper regulation.

From the above it will be apparent that I have provided an exceptionally efficient and economical arrangement for bringing about the various advantages mentioned and although I have described my improvements in great detail, nevertheless I do not desire to be limited to such details except as specified hereinafter in the claims.

Having fully and clearly described my invention what I claim and desire to secure by Letters Patent is:

1. The combination of a distribution circuit, a storage battery in operative relation thereto, means for regulating the battery action responsive to electrical fluctuations on the distribution circuit, and an induction device responsive to electrical fluctuations on the distribution circuit and arranged to cause similar fluctuations in the battery.

2. A system of electrical distribution, comprising a distribution circuit therefor, a storage battery in operative relation thereto, a transformer connected to have its primary responsive to electrical fluctuations on the distribution circuit, and means whereby the transformer may cause the charge or discharge of the battery responsive to said fluctuations.

3. A system of electrical distribution comprising a distribution circuit and its source, a storage battery connected therewith, a booster in the battery connection, means for causing the booster to respond to electrical fluctuations on the distribution circuit, and an induction means responsive to load fluctuations on the distribution circuit and connected with the booster field to cause the booster to respond to said fluctuations.

4. A system of electrical distribution comprising a distribution circuit and its source, a storage battery connected therewith, a booster in the battery connection, means for causing the booster to respond to electrical fluctuations on the distribution circuit, and a transformer connected to have its primary responsive to electrical fluctuations on the distribution circuit, for causing the charge or discharge of the battery responsive to said fluctuations.

5. A system of electrical distribution, comprising a generator, a distribution circuit, a storage battery connected therewith, a booster in the battery connection, field windings for said booster, one of said windings in series with the generator, and an induction device responsive to load fluctuations in the distribution circuit, and connected with the other of said booster field windings.

6. A system of electrical distribution, comprising a generator, a distribution circuit, a storage battery connected therewith, a booster in the battery connection, field windings for said booster, one of said windings in series with the generator, and the other of said windings connected across the battery terminals, and an induction device connected with said last named booster field winding and responsive to load fluctuations in the distribution circuit.

7. A system of electrical distribution, comprising a generator, a distribution circuit, a storage battery connected therewith, a booster in the battery connection, field windings for said booster, one of said windings in series with the generator, and an induction device having its primary in the distribution circuit and responsive to load fluctuations therein, the secondary of said induction device connected in circuit with the other of said booster field windings.

8. A system of electrical distribution, comprising a generator, a distribution circuit, a storage battery connected therewith, a booster in the battery connection, field windings for said booster, one of said field windings in series with the generator and the other of said windings connected across the battery terminals, and an induction device having its primary in the distribution circuit and responsive to load fluctuations therein, and its secondary connected with the last named booster field winding.

9. A system of electrical distribution comprising a source of electrical energy, a distribution circuit in operative relation thereto, a compensatory storage battery therefor, means for regulating the charge or discharge of the battery in accordance with fluctuations of load on said circuit, and a transformer connected to have its primary responsive to electrical fluctuations on the distribution circuit, for causing the charge or discharge of the battery responsive to said fluctuations.

10. A system of electrical distribution, comprising a generator, a distribution circuit, a storage battery connected therewith, a booster in the battery connection, field windings for said booster, one of said field windings in series with the generator, and an induction device having its primary in the generator circuit and responsive to load fluctuations therein, and its secondary connected with the other of said booster field windings.

11. A system of electrical distribution, comprising a distribution circuit, a storage battery connected therewith, a booster in the battery connection, field windings for said booster, one of said windings in series with the generator and the other of said windings connected across the battery terminals, and an induction device having its primary in the generator circuit and responsive to load fluctuations therein, and its secondary connected with the last named booster field winding.

12. A system of electrical distribution, comprising a generator, a distribution circuit, a storage battery connected therewith, a booster in the battery connection, field windings for said booster, one of said field windings in series with the generator, and an induction device responsive to load fluctuations in the distribution circuit and having its primary connected as a shunt for the said booster field winding, and its secondary connected with another of the booster field windings.

13. A system of electrical distribution, comprising a generator, a distribution circuit, a storage battery connected therewith, a booster in the battery connection, field windings for said booster, comprising heavy field windings in series with the generator, and connected with the booster and battery, and an induction device responsive to load fluctuations in the distribution circuit, said induction device having its primary connected as a shunt to the heavy booster field windings, and its secondary connected with another of said booster field windings.

14. A system of electrical distribution, comprising a generator, a distribution circuit supplied therefrom, and comprising the generator circuit and the load circuit, a storage battery connected to the distribution circuit, and a booster in the battery connection, field-windings for said booster, one of which is in series in the generator circuit, and an induction device responsive to load fluctuations in the distribution circuit, and connected with another of said booster field windings.

15. A system of electrical distribution, comprising a generator, a distribution circuit supplied therefrom, and comprising the generator circuit and the load circuit, a storage battery connected to the distribution circuit, and a booster in the battery connection, field windings for the booster, one of said field windings in series in the generator circuit and the other of said windings connected across the battery terminals, and an induction device responsive to fluctuations in the load and connected with the last named booster field winding.

16. A generator and its work circuit, a storage battery and booster in parallel therewith, a transformer having its primary responsive to fluctuations of the work circuit and its secondary operatively arranged in respect to the booster field, and means for maintaining the excitation of the booster field produced by the transformer, substantially as described.

17. In an electrical system of distribution, the combination of a substantially constant source of electromotive force, a distribution circuit, induction apparatus therein, a regulating dynamo provided with opposing field coils, one of said coils being arranged to have a current varying in intensity with the load on said circuit and the other of said coils being connected to the substantially constant source of electromotive force and to said induction apparatus.

18. In an electrical system of distribution, the combination of a substantially constant source of electromotive force, a direct current distribution circuit, a regulating dynamo in operative relation thereto provided with two field coils the magneto-motive force of one of which varies with the load of the system and the other of which is connected to the substantially constant source of electromotive force and means for causing the magneto-motive force of the latter to vary as the rate of change of said load.

19. In an electrical system of distribution, the combination of a distribution circuit, a regulating circuit in operative relation thereto, a regulating dynamo therefor, a field coil for said dynamo arranged to produce a magneto-motive force which varies as the load on the system, and another field for said dynamo, and means for causing the magneto-motive force of said last mentioned coil to vary as the rate of change of said load.

20. In an electrical system of distribution, the combination of a source of electromotive force, a distribution circuit, a regulating dynamo provided with opposing field coils one of said coils having a magneto-motive force which varies responsive to load changes on said circuit and the other of said coils being connected to the source of electromotive force, and means for causing the magneto-motive force of said last mentioned coil to vary responsive to the rate of change of said load.

21. In an electrical system of distribution, the combination of a direct current distribution circuit, a storage apparatus in operative relation thereto and regulating apparatus therefor including a dynamo having means for causing its field flux to vary responsive to load variations on the circuit and means for also causing said flux to vary responsively to the rate of change of said load.

22. In an electrical system of distribution, a distribution circuit, a compensatory storage battery in operative relation thereto, a booster for the battery and a transformer connected to be responsive to electrical fluctuations of said circuit for regulating the booster to cause the battery to charge or discharge responsive to said fluctuations.

23. In an electrical system of distribution, a distribution circuit, a compensatory storage battery therefor, and means responsive to changes of current in the distribution circuit for causing the charge or discharge of the battery responsive to the rate of change of load on said distribution circuit current.

24. In an electrical system of distribution, the combination of a direct current distribution circuit, a regulating dynamo provided with regulating field coils, and means for causing said field coils to produce a flux which will vary substantially coincidently and at the same rate as the current in said distribution circuit.

25. In an electrical system of distribution, a distribution circuit, a compensatory storage battery therefor, a booster for the battery, and means responsive to changes of current in the distribution circuit for causing the booster to regulate the charge or discharge of the battery responsive to the rate of change of load on said distribution circuit current.

26. In an electrical system of distribution, a distribution circuit, a compensatory storage battery therefor, a booster for the battery, and a transformer responsive to changes of current in the distribution circuit for causing the booster to regulate the charge or discharge of the battery responsive to the rate of change of said distribution circuit current.

27. In an electrical system of distribution, a distribution circuit, a compensatory storage apparatus in operative relation thereto, a regulating dynamo for said apparatus, having field windings for causing the dynamo to regulate the charge and discharge of the apparatus responsive to changes in load on said circuit and induction means responsive to changes in load on said circuit and acting to quicken the action of said dynamo.

ALBERT S. HUBBARD.

Witnesses:
CHARLES M. GOULD,
J. HOMER REED.